Patented Dec. 6, 1927.

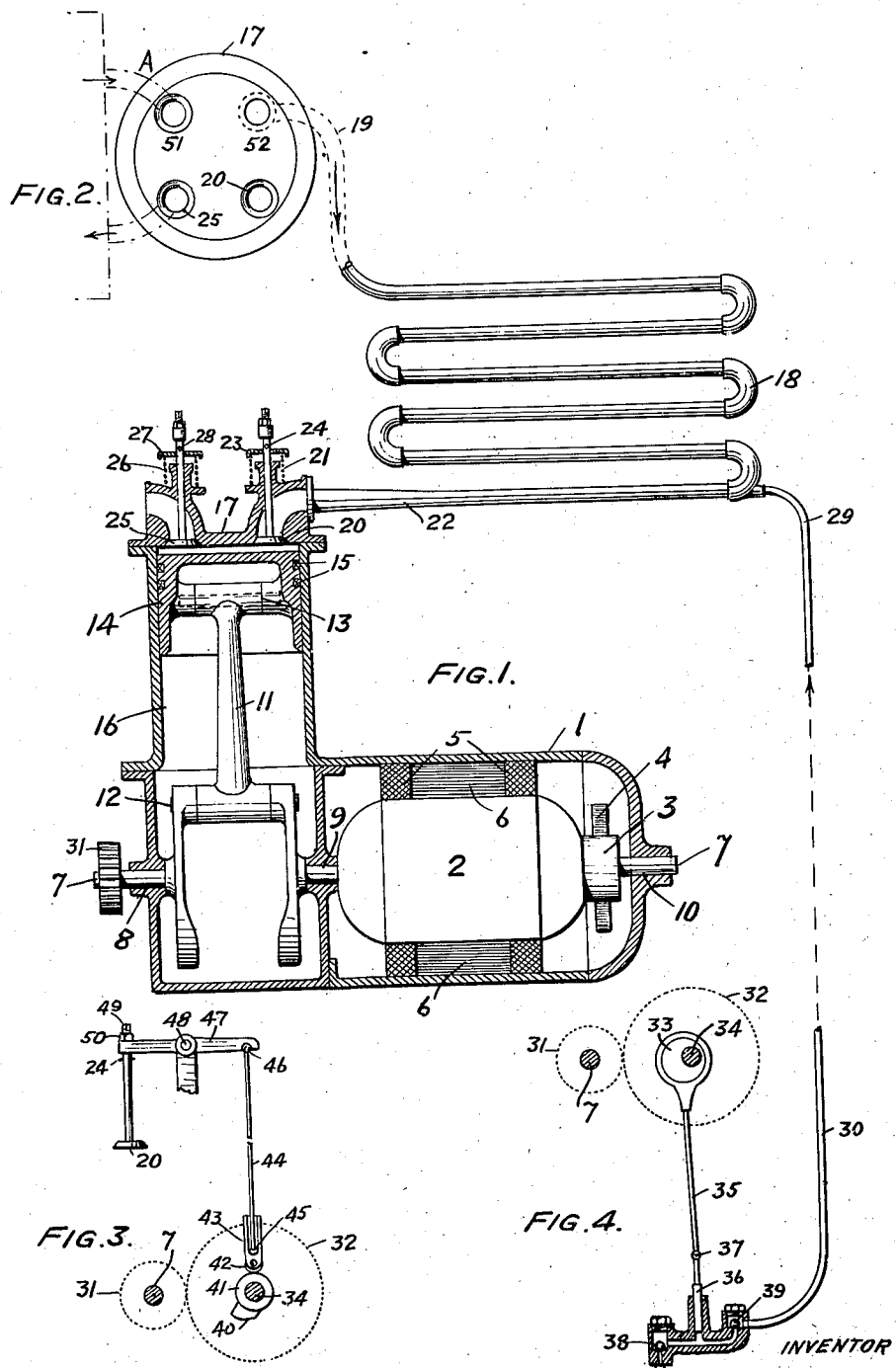

1,651,826

UNITED STATES PATENT OFFICE.

FREDERICK B. MacLAREN, OF JAMAICA, NEW YORK, ASSIGNOR TO THE MacLAREN ELECTRIC APPLIANCE CORPORATION, OF NEW YORK, N. Y., A CORPORATION OF DELAWARE.

REFRIGERATING MACHINERY.

Application filed June 13, 1922. Serial No. 567,909.

This invention relates to improvements in refrigerating machinery and more particularly to that type of such machinery in which air is used as a circulating medium.

One object of this invention is to provide a simple and cheap construction for the compressing and expanding of air, a further object of the invention is the provision of suitable valve gear to take care of compression and expansion of the air in a single cylinder. A still further object of the invention is the provision of means for reducing the temperature drop, and this I do by the injection of atomized water or other material of high thermal capacity into the air line before expansion.

The invention will be claimed at the end hereof but will be first described in connection with the embodiment of it chosen from other embodiments for the sake of illustration in the accompanying drawings forming part hereof and in which Figure 1 is a diagrammatic view showing the single cylinder compressor and expander with its valve gear and cooling coil.

Fig. 2 is a view of the under face of the cylinder head.

Fig. 3 is a detached elevational view of the valve gear, and

Fig. 4 is a sectional view showing in greater detail the apparatus for injecting water into the compressed air line.

Referring to the drawings, Figure 1, the numeral 1 designates the motor frame and field yoke, 2 is the motor armature, 3 the commutator, 4 the brushes, 5 the field poles and 6 the field coils. The crank shaft 7 acts also as a shaft for the motor and is supported in the three bearings 8, 9 and 10. The connecting-rod 11 encloses in its large end the crank pin 12 and in its small end the piston pin 13, which in turn is fastened to the piston 14. The piston 14 is shown as provided with two packing rings 15, and it reciprocates in the cylinder 16. This cylinder is closed at its upper end by the cylinder head 17 in which are mounted four valves. Two of these valves 51 and 52 are automatic and are not illustrated in detail because too well understood to require such illustration.

The suction valve 51 opens into the cylinder and admits air on the suction stroke from the box or enclosed space to be cooled indicated at A. The discharge valve 52 allows the compressed air to pass out of the cylinder to the cooling coil 18 through the pipe 19. The valve 20 is operated by the valve gear illustrated in Fig. 3. The spring 21 operates to hold the valve 20 closed against the pressure of the air in the pipe 22 by pressing against the spring retainer 23 which co-operates with the pin 24 in the valve stem. The valve 25 operates as an exhaust valve to let the cold air from the cylinder pass to the place indicated at A to be cooled. It is operated by a valve gear like that shown in Fig. 3 and hereinafter described, in conjunction with the spring 26, spring retainer 27 and pin 28. At 29 is shown the means for injecting a spray of water into the compressed air line for the purpose of reducing the temperature drop during expansion of the air. The conduit 30 carries the water from a small pump which may be driven by the cam shaft 34 illustrated in Fig. 3. In Fig. 4 the gear 31 is mounted on the crank shaft and drives the large gear 32 on the cam shaft 34. An eccentric 33 is rigidly fastened to cam shaft 34, and in rotating it reciprocates the eccentric rod 35 which is fastened to the piston 36 by the pin 37. Suction valve 38 and discharge valve 39 co-operate with the reciprocating piston to force a small stream of water through the conduit 30.

In Fig. 3 is again shown the pinion 31 which drives the large gear 32 that is fastened to the cam shaft 34. Mounted on the cam shaft are two cams 40 and 41. The inlet cam 40 is in action for a very small portion of a piston stroke while the exhaust cam 41 operates during a complete distance stroke. The roller 42 mounted on the valve tappet 43 co-operates with the cam 40 to move the push rod 44 having a ball end 45 seated in the tappet 43 and a ball end 46 seated in the rocker lever 47. This lever is mounted on a fulcrum 48 and has an adjusting screw 49 and locknut 50 on its inner end co-operating with the stem of the valve 20. A similar construction is used for the exhaust valve 25. It will be noticed that the ratio of the gearing between the crank shaft and cam shaft is not unity but is preferably 2 to 1 or a greater integral ratio.

When the machine is in action the motor drives the crank shaft and therefore operates the piston 14 in the cylinder 16, drawing in air through the automatic inlet 51 and discharging this air compressed to about 30 or 40 pounds pressure through the automatic discharge valve 52 and the pipe 19 to the top of the cooler 18. The compressed air is there cooled to a temperature slightly above that of the surrounding atmosphere and at the point 29 or earlier, water is injected in an atomized or finely divided state. This air is then let into the cylinder 16 when the piston 14 is at the top of its stroke and allowed to flow for a small portion, say one-fourth of the total stroke, and is then cut off. The air in the cylinder then expands doing work and helping the motor to drive the machine and in doing so its temperature drops to a point with dry air from 50 to 100 degrees below zero, but with the water injected the temperature should only drop to zero or even slightly above. On the return stroke of the piston 14 the valve 25 is opened and the cold air and water vapor is forced out into the place to be cooled. A separator may be provided for removing any surplus water not vaporized, but a separator is not shown because too well understood to require illustration. The cam-shaft 34 is run at a speed slower than that of the crank shaft to allow the compressor action to have greater volume than that of the expander action, which I have found to be essential.

It will be obvious that modifications may be made in details of construction and arrangement without departing from the spirit of the invention which is not limited to such matters or otherwise than as the prior art and the appended claims may require.

I claim:

1. In a refrigerating system a heat absorbing chamber, a cooler, and a machine connected to said cooler and chamber, said machine having a cylinder, a piston movable in said cylinder, means for establishing communication between the machine and the cooler including inlet and outlet conduits, an inlet valve in the inlet conduit, an outlet valve in the outlet conduit, means for establishing communication between the machine and the chamber inlet and outlet conduits, an inlet valve in the inlet conduit, and an outlet valve in the outlet conduit.

2. In a refrigerating system a heat absorbing chamber, a cooler, a machine connected to said cooler and chamber, said machine having a cylinder and a piston movable in the cylinder, inlet and outlet conduits interposed between the machine and the chamber and cooler, valves positioned in said machine and within said conduits said valves comprising inlet and outlet pressure valves in the corresponding inlet and outlet conduits, inlet and outlet power operated valves intermediate the cooler and chamber and within the conduits communicating with the cooler, and means for operating said machine and supplying power for the operation of said power operated valves.

3. In a refrigerating system a heat absorbing chamber, a cooler, a machine connected to said cooler and chamber, said machine having a cylinder, a piston movable in said cylinder, a conduit between the chamber and machine, a pressure operated valve in said conduit, a conduit between the machine and cooler, an outlet pressure valve within said second conduit, a third conduit between the cooler and the machine, a power operated inlet valve in said third conduit, a fourth conduit between the machine and chamber, and a power operated outlet valve in said fourth conduit, said machine, cooler, chamber and valved conduits forming a mechanism for the successive compression, cooling, expansion and heat-absorption of the gas contained in said system.

FREDERICK B. MacLAREN.